United States Patent [19]

Collins

[11] Patent Number: 4,935,853
[45] Date of Patent: Jun. 19, 1990

[54] MOTION-CONTROLLED LIGHT WITH ARC LAMP

[76] Inventor: William J. Collins, 4027 Pleasant Ridge Rd., Boulder, Colo. 80301

[21] Appl. No.: 307,306

[22] Filed: Feb. 3, 1989

[51] Int. Cl.⁵ .................... F21Y 21/30; F21Y 29/00
[52] U.S. Cl. .................. 362/272; 362/275; 362/294; 362/373; 362/287
[58] Field of Search .............. 362/261, 272, 275, 287, 362/294, 373, 419, 426, 428, 218

[56] References Cited

U.S. PATENT DOCUMENTS

| | | | |
|---|---|---|---|
| 2,907,870 | 10/1959 | Calmer | 362/294 |
| 3,180,981 | 4/1965 | Ulffers et al. | 240/47 |
| 3,361,903 | 1/1968 | Brown | 240/47 |
| 3,626,176 | 12/1971 | Tsugami | 240/47 |
| 3,684,908 | 8/1972 | Beese | 313/24 |
| 3,843,879 | 10/1974 | Eddy | 362/218 |
| 3,936,686 | 2/1976 | Moore | 313/36 |
| 3,950,650 | 4/1976 | Pray et al. | 362/294 X |
| 4,074,125 | 2/1978 | Casalou | 362/271 |
| 4,298,911 | 11/1981 | Headrick | 362/272 X |
| 4,321,659 | 3/1982 | Wheeler | 362/293 |
| 4,503,360 | 3/1985 | Bedel | 315/112 |
| 4,527,224 | 7/1985 | Sangiano et al. | 362/287 X |
| 4,546,420 | 10/1985 | Wheeler et al. | 362/268 |
| 4,586,117 | 4/1986 | Collins | 362/373 |
| 4,630,182 | 12/1986 | Moroi et al. | 362/294 |
| 4,701,833 | 10/1987 | Bornhorst | 362/373 X |
| 4,734,835 | 3/1988 | Vinir et al. | 362/373 X |

Primary Examiner—Ira S. Lazarus
Assistant Examiner—Richard R. Cole
Attorney, Agent, or Firm—Gregg I. Anderson

[57] ABSTRACT

A motion-controlled light for movement about two independent axes is disclosed. The light includes a housing assembling having adjustably connected thereto a light assembly incorporating a high intensity arc lamp. The housing assembly is connected to a support assembly which provides for pivotal mounting of the housing assembly about the two axes. Separate fans are provided to cool the anode and the cathode of the arc lamp, providing a greater efficiency and longer life to the arc lamp.

14 Claims, 5 Drawing Sheets

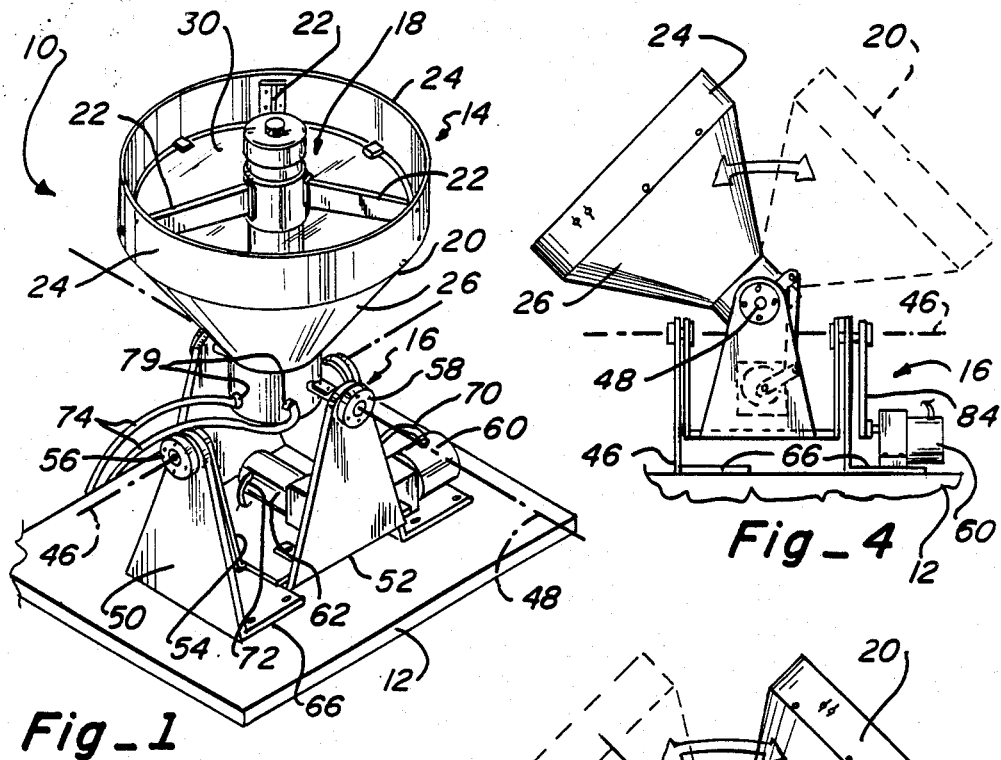
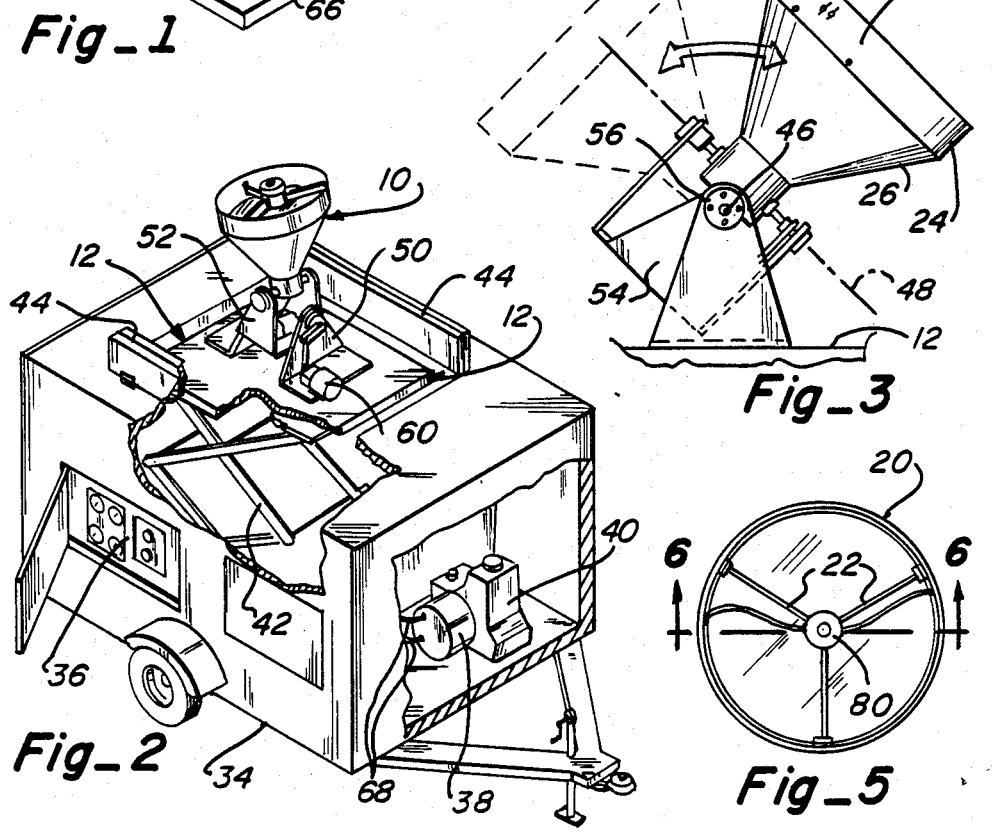

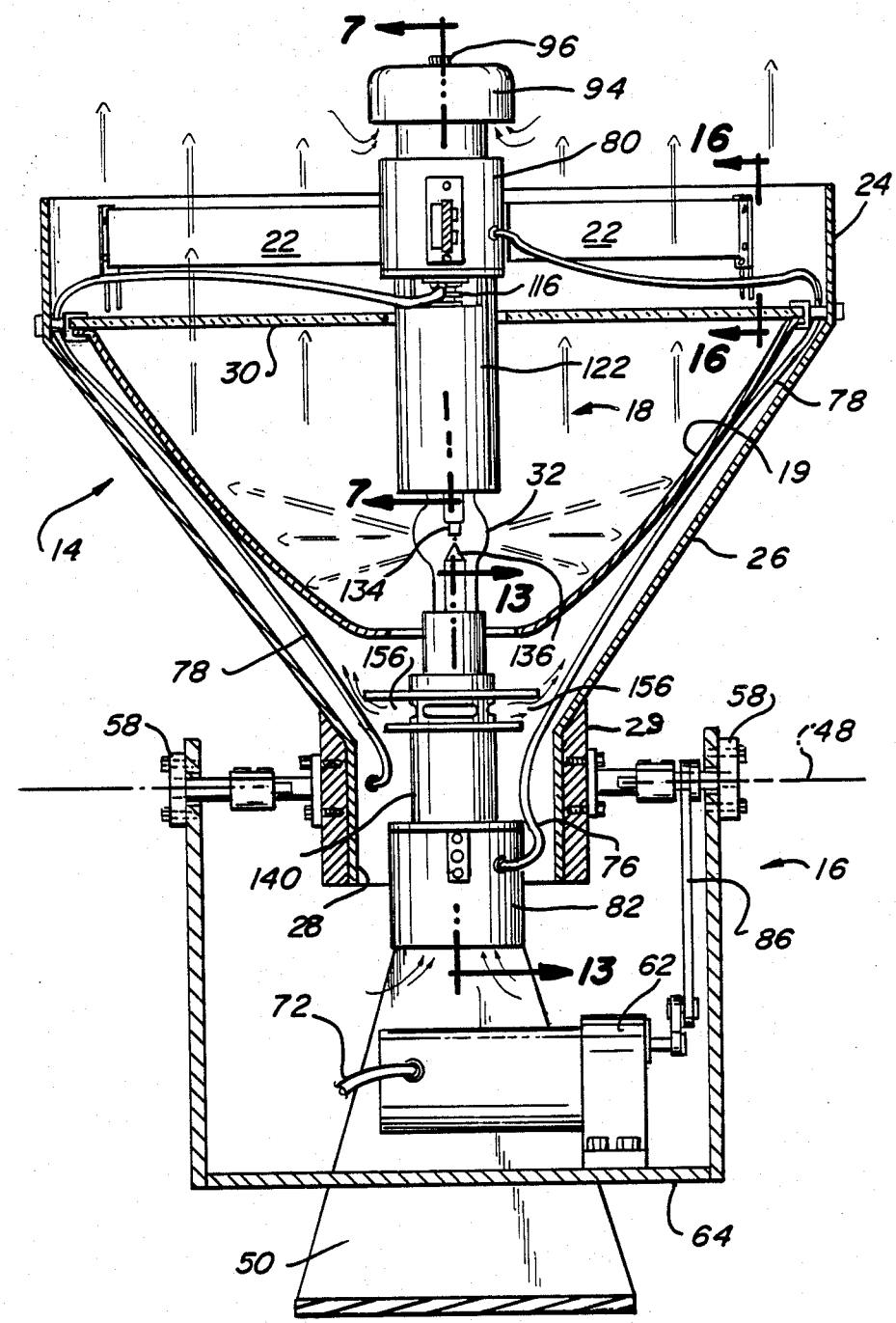
Fig_6

U.S. Patent   Jun. 19, 1990   Sheet 3 of 5   4,935,853
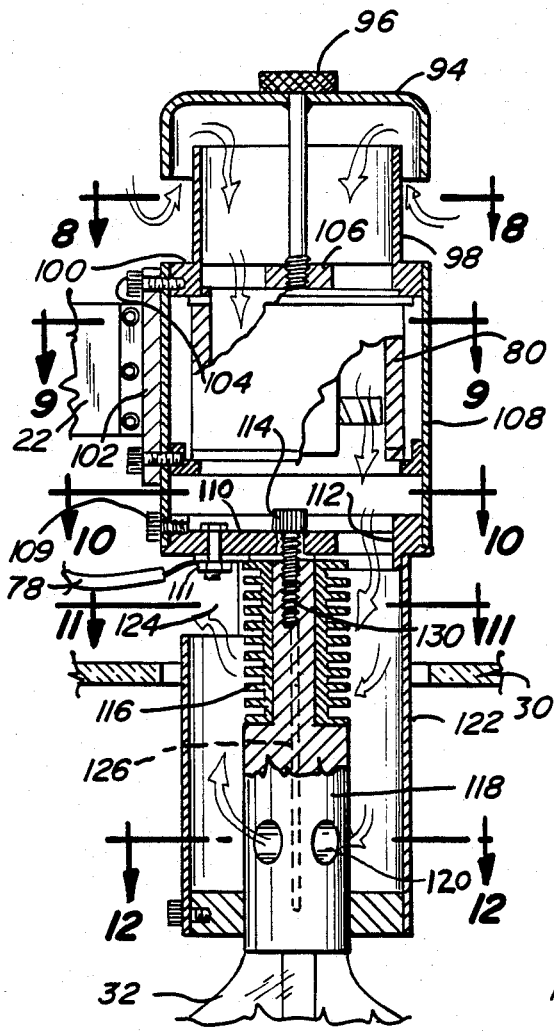
Fig_7
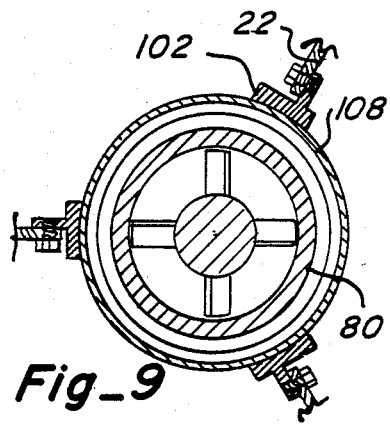
Fig_9
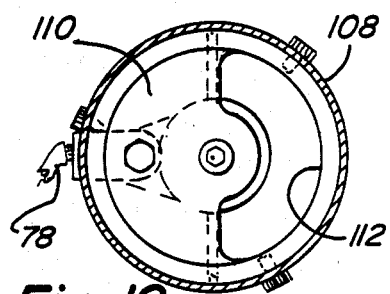
Fig_10
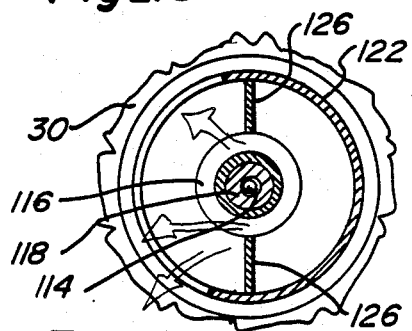
Fig_11
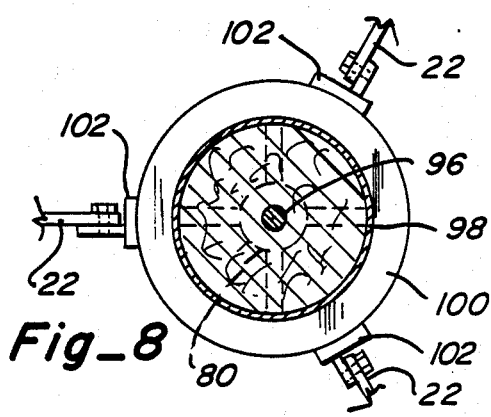
Fig_8
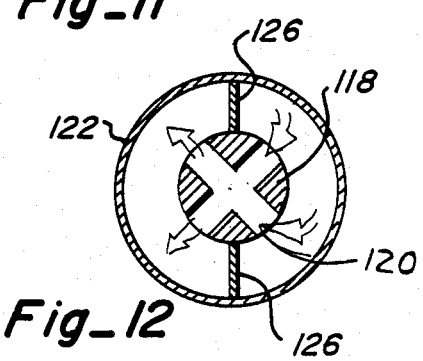
Fig_12

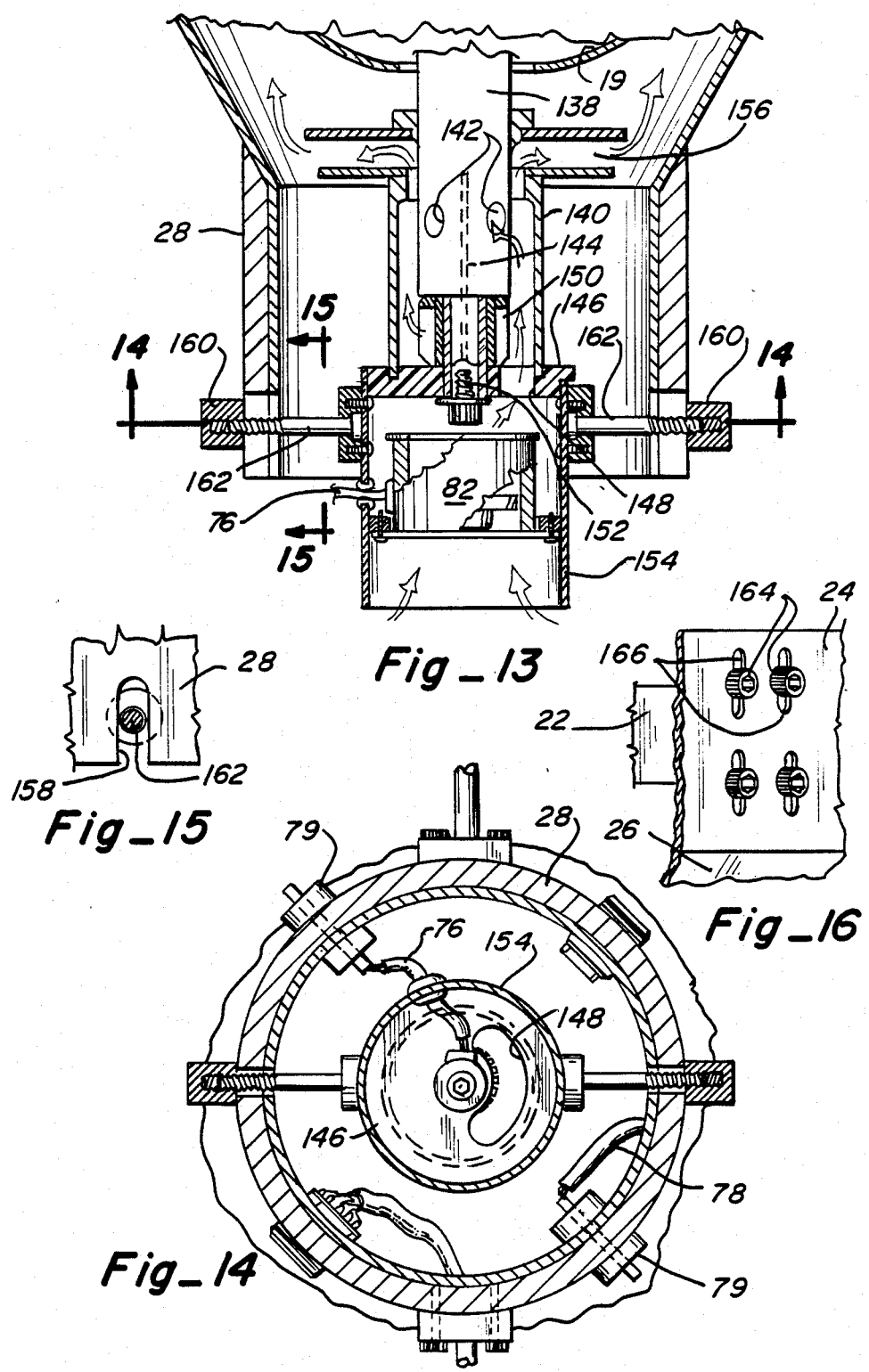

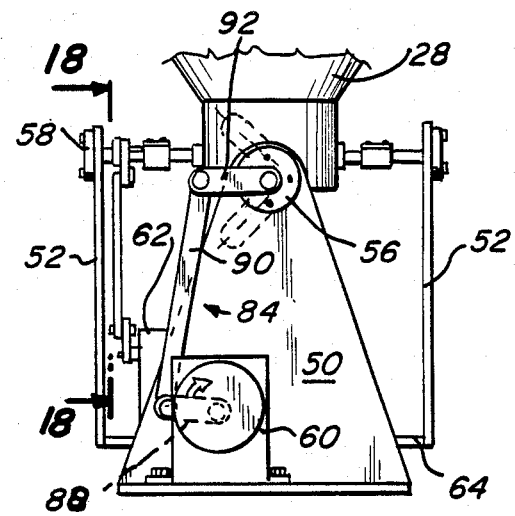
Fig_17
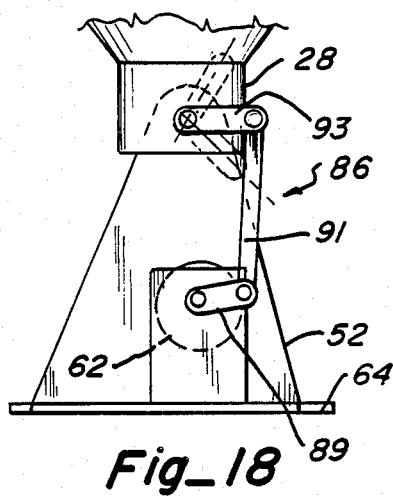
Fig_18
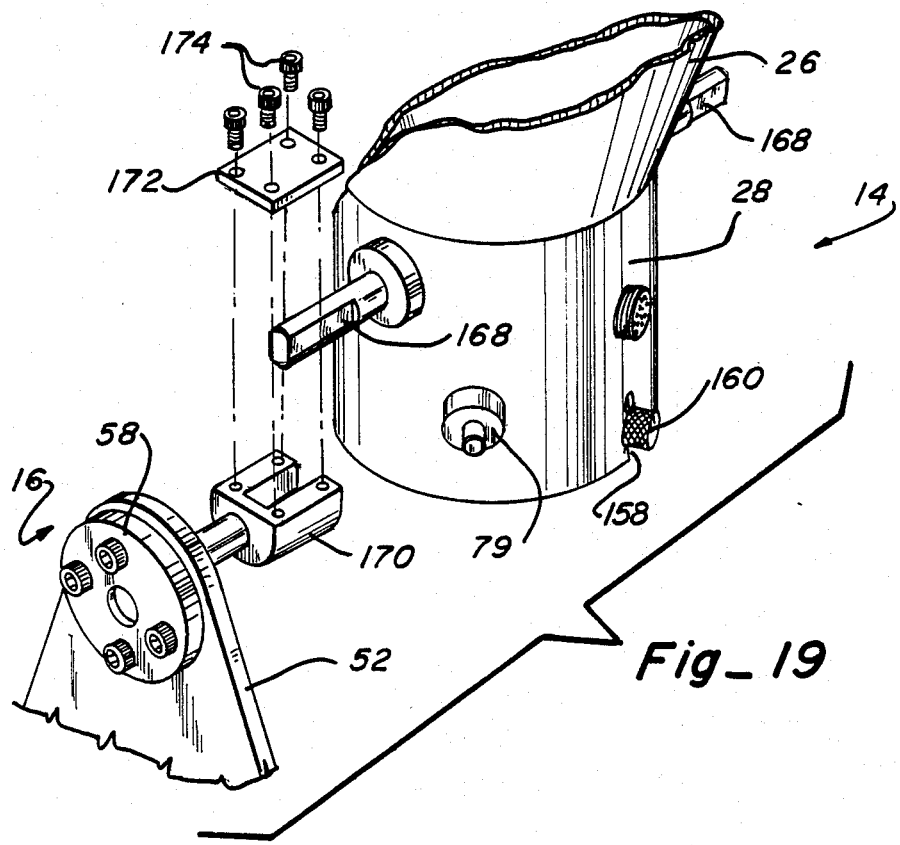
Fig_19

MOTION-CONTROLLED LIGHT WITH ARC LAMP

BACKGROUND OF THE INVENTION

1. Field Of The Invention

This invention relates to high-intensity arc lamps, and more particularly, to the dissipation of heat generated by short-arc, gaseous-discharge lamps operating at high temperatures and pressures. The light of the present invention incorporates such a high intensity arc lamp in a light which is motion controlled to pivot about two axes.

2. Description Of The Prior Art

As it is known in the art, a short-arc discharge lamp generally includes an anode electrode and a cathode electrode located within a sealed quartz envelope containing a gas, such as xenon, mercury, krypton, etc., and is maintained under high pressure in the order of about 20 atmospheres. The anode and cathode electrodes are aligned axially in the envelope with their tips spaced apart by a predetermined distance to conduct current upon application of high voltage pulses and produce an intense arc emitting a continuous spectrum of useful light. Thus, the short-arc, high-intensity lamp has been used as an excellent source of concentrated white light for searchlights, spotlights and the like. In most applications, for good performance, an auxiliary lens or mirror has been used to direct emitted light in a concentrated beam. The light source is generally positioned at a focal point of the accompanying reflecting mirror, and the surface of the mirror is maintained free of dust by enclosing it within a sealed housing.

With ever-increasing demand for short-arc lamps of the aforedescribed type, their capacity as a source for high intensity light has often been stretched beyond the design limits with the resulting detrimental effect of shortening the life of the lamp. U.S. Pat. No. 3,684,908, issued to N. C. Beese, discloses such an arc lamp with a parabolic reflector shell having a plurality of external air ducts through which air is forced to cool the heated lamp. The ducts extend radially from a central, tubular neck of a reflector shell toward an outer rim to provide passages for removing heat from the lamp through the reflector shell. An exterior surface of the parabolic reflector includes cooling fins. An electric fan is used to speed up the passage of air and, thus, increase the cooling rate.

Direct cooling of a conventional lighting fixture using a fan is shown in U.S. Pat. No. 4,321,659, issued to E. Wheeler.

Convection air cooling of a compact, electric discharge lamp is shown in U.S. Pat. No. 4,503,360, issued to D. Bedel. Bedel includes two compartments: one for a light source, such as a low-pressure discharge lamp, and the other for an electrical circuit for energizing the lamp. Heat generated from the lamp is directed away from the electrical circuit compartment, preventing failure of electrical components.

A fan for drawing air past light filters along a tortuous air path is shown in U.S. Pat. No. 4,546,420, issued to D. Wheeler, et al. Another air-cooled light is seen in U.S. Pat. No. 4,586,117, issued to W. Collins, the inventor herein.

A cooling device for a xenon arc lamp is shown in U.S. Pat. No. 3,626,176, to T. Tsugami. The reflector mirror is cooled, and a double-wall construction of the light source casing incorporates water jackets. Cooling air supplied at the bottom of the casing is directed through inner and outer concentric, annular passages formed in a supply duct.

Use of a heat sink as a cooling system connected to a reflector or a high intensity lamp is shown in U.S. Pat. No. 3,936,686, issued to D. Moore.

Another air-cooled arc lamp as shown in U.S. Pat. No. 3,180,981, issued to H. Ulffers, et al. Ulffers utilizes moving air in the lamp housing and cooling fans to facilitate removal of heat radiation. Use of a heat sink in a high intensity lamp in place of air cooling is shown in U.S. Pat. No. 3,361,903, issued to R. Brown.

A spotlight movable in both a horizontal and vertical plane as a result of corresponding movements of a handle operably connected thereto is shown in U.S. Pat. No. 4,074,125, issued to R. Casalou.

The prior art does not disclose concurrent universal movement of a spot or search light about two axes. The visual patterns available by controlling the movements simultaneously of a light about two independent axes are likewise not shown in the prior art.

The prior art does not disclose cooling by the use of more than one fan and a heat exchanger, each fan associated with either the cathode electrode or the anode electrode of an arc lamp.

SUMMARY OF THE INVENTION

It is an object of the present invention to provide a motion-controlled light universally movable about two independent axes.

It is another object of the present invention to provide a motion-controlled light with a more efficient high-intensity arc lamp, and, more particularly, to increase the life and light intensity of such an arc lamp.

In accordance with the objects of the invention, a motion-controlled light is pivotal about two independent axes. The axes can be perpendicular and intersecting, defining a plane parallel to the earth as a reference plane. The light includes a housing assembly and a dual-axis support assembly. The housing assembly is directed upwardly from the reference plane, so that when an arc lamp light assembly of the light is on, a spot or search light is directed away from the reference plane.

The support assembly provides the light with pivotal movement about the two independent axes. One of the axes is defined by a pair of end supports, which have pivotally-connected thereto hangers which support the light at a suspended position and allow for pivotal movement of the entire light about a first axis.

The hanger is connected to and carries a suspended light support, which light support is pivotally connected to the housing assembly to provide for pivotal movement of the housing assembly about a second axis thereby defined. The hangar is therefore pivotal about the first axis and the housing assembly is pivotal about the second axis, resulting in pivotal motion control for the light about two independent axes.

The light incorporates an arc lamp in the light assembly. The arc lamp has an anode electrode and a cathode electrode at the top and bottom of the arc lamp, respectively. The arc lamp light assembly includes a fan mounted to either end of the arc lamp for moving air along air pathways, through end ferrules, past a heat sink or exchanger, and across end sections of the arc lamp associated with one end the anode and cathode electrodes.

The arc lamp light assembly is mounted into a housing of the housing assembly in such a manner that the arc lamp can be moved with respect to a parabolic mirror reflector mounted in the housing of the housing assembly. This allows alteration of the position of the arc lamp with respect to the focal point of the parabolic mirror reflector.

Quick release of the entire housing assembly from the dual-axis support assembly allows for replacement of the housing assembly should a mechanical or electrical failure occur. Ideally, the light is mounted to a trailer for easy transport to and from special events. The light is then used to help promote those special events.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is a perspective view of a motion-controlled light of the present invention mounted onto a platform.

FIG. 2 is a perspective view of the invention shown in FIG. 1 incorporated into a transport trailer.

FIG. 3 is an elevational view of a housing assembly and support assembly of the invention shown in FIG. 1, the housing assembly being shown pivotal about a first axis.

FIG. 4 is an elevational view similar to FIG. 3 with the housing assembly being shown pivotal about a second axis.

FIG. 5 is a top plan view of the housing assembly of the invention shown in FIG. 1.

FIG. 6 is an enlarged sectional view taken along line 6—6 of FIG. 5.

FIG. 7 is an enlarged fragmentary sectional view taken along line 7—7 of FIG. 6.

FIG. 8 is a sectional view taken along line 8—8 of FIG. 7.

FIG. 9 is a sectional view taken along line 9—9 of FIG. 7.

FIG. 10 is a sectional view taken along line 10—10 of FIG. 7.

FIG. 11 is a sectional view taken along line 11—11 of FIG. 7.

FIG. 12 is a sectional view taken along line 12—12 of FIG. 7.

FIG. 13 is an enlarged fragmentary sectional view taken along line 13—13 of FIG. 6.

FIG. 14 is a sectional view taken along line 14—14 of FIG. 13.

FIG. 15 is a enlarged fragmentary view of a connection between an arc lamp assembly and the housing assembly of the invention shown in FIG. 1.

FIG. 16 is an enlarged fragmentary view of a connection between the arc lamp assembly and the housing of the invention shown in FIG. 1.

FIG. 17 is an elevational view of a pivotal connection between the support assembly and the housing assembly for pivotal movement about the first axis.

FIG. 18 is an elevational view similar to FIG. 17 for pivotal movement about the second axis.

FIG. 19 is an enlarged exploded perspective view of a quick release connection between the support assembly and the housing assembly of the invention shown in FIG. 1.

DESCRIPTION OF THE PREFERRED EMBODIMENT

Referring to FIG. 1, a motion-controlled light 10 is mounted to a platform 12. The light 10 includes a housing assembly 14 connected to a support assembly 16 for pivotal movement about two independent axes 46 and 48. The axes 46 and 48 are substantially perpendicular, but do not necessarily intersect. The housing assembly 14 further includes an arc lamp light assembly 18 mounted therein, as best seen in FIG. 6.

An arc lamp 32 of the arc light assembly 18 includes a centrally-enlarged, tubular quartz section containing xenon, mercury, krypton, or like gases sealed in an envelope under high pressure. The high intensity arc lamp 32 has increased efficiency and longer life as a result of being cooled by air moving under the influence of a top fan 80, which cools an anode electrode 134, and a bottom fan 82, which cools a cathode electrode 136 of the arc lamp 32.

The housing assembly 14 includes a parabolic mirror reflector 19 connected in a generally conically-shaped housing 20. The housing assembly 14 is connected to the light assembly 18 by radially-extending lamp struts 22. The struts 22 are fixedly connected at a proximal end to the top fan 80 and adjustably-connected at a terminal end to a cylindrical portion 24 of the housing 20. The cylindrical portion 24 is integrally connected to a flared portion 26 of the housing 20, which flared portion 26 is, in turn, integrally formed with a short, tubular housing base 28. A support sleeve 29 (FIG. 6) is heat shrunk or otherwise connected to the housing base 28 for connection to the support assembly 16, in a manner to be described hereinafter. A tempered borosilicate lens cover 30 completes the housing assembly 14. The lens cover 30 includes an opening through which the light assembly 18 passes. The lens cover 30 is connected across the housing 20 generally at the position where the cylindrical portion 24 makes the transition into the flared portion 26.

As seen in FIG. 2, it is contemplated that the light 10 will be transported to special events on a trailer 34. The varying motions through which the light 10 can pass, as it pivots about the axes 46 and 48, is useful to attract people to such special events. The trailer 34, therefore, includes peripheral equipment necessary for the operation of the light 10. A control panel 36 is used to activate lift motor 40, which operates scissors lift 42, raising and lowering the light 10 with respect to the enclosed trailer 34. A generator 38 provides electrical power to the lift motor 40, as well as to the arc lamp 32 and motors 60 and 62 of the support assembly 16, which motors 60 and 62 move the housing assembly 14 about the axes 46 and 48. Articulated door covers 44 close over the light 10 when the lift 42 is in the down position and the light 10 is enclosed within the trailer 34.

The support assembly 16 is best seen in FIGS. 1, 3, 4, 17 and 18. A stationary end support 50 and integral foot pad 66 are fixedly connected to the platform 12, defining a fixed base of the support assembly 16. A bearing 56 connects the opposed end supports 50 to a corresponding pair of hangers 54. The axis 46 passes through the bearing 56 for the end supports 50 and the hangers 54, defining a first axis of pivotal movement.

The hangers 54 are interconnected by motor platform 64, which platform 64 carries the motor 62 and a pair of suspended end supports 52 mounted to the platform 64 intermediate the hangers 54. The end supports 52, hangars 54, and platform 64 form a movable base of the support assembly 16. The end supports 52 have bearings 58 for pivotally mounting a coupling 170, providing pivotal movement about the second axis 48. As seen in FIG. 19, the coupling 170 connects the suspended end support 52 to an axle 168 connected to the sleeve 29 of the housing assembly 14. The axle 168 is aligned with the axis 48, defining a second axis of pivotal movement for the housing assembly 14.

The motor 60 is connected through drive linkage 84 to the hangers 54 (FIG. 17) to pivot the movable base about the first axis 46. The linkage 84 includes a drive link 88 fixedly connected to the motor 60 and pivotally connected to link 90. The link 90 is pivotally connected to one end of connecting link 92. The other end of connecting the link 92 is fixedly connected to one of the hangers 54 (FIG. 1) through a stub axle at the bearing 56. Rotational motion of the drive crank 80 imparted by the motor 60 will cycle the movable base through an arc substantially as seen in FIG. 3.

In a like manner, the motor 62 is mounted to the platform 64, which platform 64 is connected to both the hangers 54 and the suspended end supports 52 (FIGS. 17 and 18). The motor 62 has a drive linkage 86 associated therewith to pivot the housing assembly 14 about the second axis 48. The drive linkage 86 includes a drive crank 89 fixedly connected to the motor 62 at one end and pivotally connected at the other end to link 91. A second end of the link 91 is pivotally connected to connector link 93, which is fixedly connected, through coupling 170 (FIG. 19), to the axle 168 of the housing assembly 14. The bearing 58 of the end support 52 permits the coupling 170 and axle 168 to pivot relative to the end support 52 about the second axis 48. Circular motion of the motor 62 imparts pivotal motion to the housing assembly 14 through an arc (FIG. 4) about the axis 48. Rotational motion of the motor 62 rotates the drive crank 89 and the connecting crank 93 about their respective axes of rotation.

As seen in FIG. 2, power cables 68 initiate at the generator 38. A power cable 70 supplies power to the motor 60, while the motor 62 receives power along power cable 72 (FIGS. 1 and 6). The housing assembly 14 receives power along cables 74, which supply power to the arc lamp 32. The fans 80 and 82 receive power from conductors 78 and 76, respectively. The housing sleeve 29 includes a pair of releasable power cable connectors 79 having opposed orientation, providing for quick and easy removal of the entire housing assembly 14 and attached light assembly 18 from the support assembly 16 in a manner to be described hereinafter (FIGS. 1, 14 and 19).

Referring now generally to FIG. 6, the light assembly 18 will be described in detail. A top end includes a cowling 94 connected by an attachment bolt 96 to the top fan 80. As seen in FIG. 7, air under the influence of the fan 80 enters the cowling 94 and is directed longitudinally down a first air path or passageway of the light assembly 18 toward the anode electrode 134.

The air enters a generally-cylindrical top inlet 98 mounted in a fixed position relative to the fan 80 by mounting bolts 104, which bolts 104 pass through a mounting bracket 102 of the struts 22 and into a mounting flange 100 of the top inlet 98. An internally-threaded fan mount 106 of the fan 80 receives the threaded end of the attachment bolt 96. The mounting bolts 104 also pass through an outer fan housing 108 of the fan 80.

Still referring to FIG. 7, air leaves the fan 80, generally directed by the fan housing 108, and encounters a top baffle plate 110. The baffle plate 110 is secured to the fan housing 108 by bolt 109. The top fan conductor 78 is connected by contact 111 to the baffle plate 110, from where electrical power is picked up by the fan 80 and the lamp 32.

An opening 112 in the baffle 110 directs air past a heat sink 116 integrally connected to a top end section 118 of the arc lamp 32 (FIG. 10). A lamp connection bolt 114 passes through the baffle plate 110 and is internally received in threaded bore 130 of the heat sink 116 to connect the heat sink 116 and arc lamp 32 to the baffle plate 110.

Intersecting anode cooling passages 120 are formed through the top end section 118 (FIG. 12). A top cooling duct cap or ferrule 122 is rigidly connected to the baffle plate 110 and includes an outlet opening 124 from which the moving air exits the first air path of the lamp 32. As can be seen in FIG. 7, air enters and exits above the lens cover 30. A vertical baffle fin 126 integrally formed on and protruding inwardly from the ferrule 122 positions the top end section 118 of the lamp 32 with respect to the top ferrule 122, segregating the top end section 118 into two chambers (FIGS. 11 and 12). The fin 126 directs air down one side of the heat sink 116 from the opening 112, through the passageways 120 and up the other side of the heat sink 116 (FIGS. 7 and 10-12).

Referring now to FIGS. 6 and 13, a bottom of the light assembly 18 will be described. A second air path in the bottom of the light assembly 18 cools the cathode electrode 136 of the arc lamp 32.

A bottom end section 138 of the arc lamp 32 passes through an opening in the reflector mirror 19 and into a bottom cooling duct cap or ferrule 140. The end section 138 includes cathode-cooling passages 142 similar to passages 120 described previously. A second vertical baffle fin 144 of the bottom ferrule 140 extends longitudinally adjacent the end section 138, providing a segregated second air path for air flowing into the passages 142 and again defining a chamber on either side of the bottom end section 138. A bottom baffle 146 is connected to the bottom ferrule 140. An opening 148 in the baffle 146 receives air from the fan 82 and directs the air into the ferrule 140, through the cathode-cooling passageways 142, exiting the lamp assembly 18 through outlet 156. The air then exits the housing assembly 14 passing between the flared portion 26 of the housing 20 and the parabolic reflector 19 (FIG. 6), cooling the reflector 19.

A spacer 150 supports the end section 138 at a fixed position above the baffle 146 and receives contact bolt 152, which passes through the baffle 146 and which is electrically connected to the generator 38. The fan conductor 76 electrically connects the fan 82 to the generator 38 (FIGS. 13 and 14) and passes through a bottom fan housing 154, which housing supports the fan 82 and is connected to the baffle 146.

The position of the lamp 32 with respect to the reflector mirror 19 can be altered by moving the light assembly 18 with respect to the housing assembly 14. As seen in FIG. 13, mounting bolts 162 are connected to the fan housing 154 and extend radially away therefrom and through the housing base 28 and sleeve 29. Cap nuts 160 ride on PTFE bushings and allow for differential thermal expansion of the lamp 32. Bolts 162 connect to the nuts 160, passing through slots 158 formed in the mounting sleeve 29, and connect to the fan housing 154 (FIGS. 13 and 15).

In like manner, the connection between the struts 22 and the cylindrical portion 24 of the housing 20 is longitudinally adjusted by moving the struts relative to slots 166 formed in the cylindrical portion 24 (FIG. 16). Again, tightening or loosening cap nuts 164 on bolts which connect the struts 22 and the housing secure the position of the entire light assembly 18 with respect to the housing assemby 14.

As best seen in FIG. 19, the entire housing assembly 14 is removable from the support assembly 16. This is accomplished by removing connecting bolts 174 from the coupling 170 and by disconnecting power cables 74 from cable connectors 79. In case of any failure at a special event, the entire housing assembly 14 is quickly and easily removed without the need to change and refocus the lamp 32.

Although the invention has been described with a certain degree of particularity, the full scope of the invention is seen in the appended claims and their equivalents.

What is claimed:

1. A motion-controlled light including a housing and a lamp connected thereto, comprising in combination:
   a support assembly having a fixed base and a movable base pivotally mounted thereto for pivotal movement of said movable base with respect to said fixed base about a first axis, said housing pivotally mounted to said movable base about a second axis;
   motor means for pivoting said movable base about said first axis and for pivoting said housing about said second axis whereby said light has universal movement;
   said fixed base including a platform and two end supports, said end supports supporting axles of said movable base, said axles connected to suspended hangers, which hangers carry a platform therebetween, said platform having second end supports connected thereto which pivotally connect to axles of said housing;
   first motor means mounted on said fixed base, and operatively connected to said movable base for pivoting said movable base about said first axis, and second motor means mounted on said movable base and operatively connected to said light housing for pivoting said housing about said second axis.

2. The invention as defined in claim 1 wherein said first motor means includes a drive linkage interconnecting said motor and said axle of said hangers and said second motor means includes a second drive linkage interconnecting said motor and the axle of said housing.

3. The invention as defined in claim 2 wherein each of said drive linkages includes a drive link connected to said first and second motor means, a link and a connecting link connected to said axle of said hanger and said housing respectively.

4. The invention as defined in claim 1 wherein said lamp is connected to a light assembly, which light assembly is positioned along a central axis of said housing relative to a parabolic reflector contained in said housing.

5. The invention as defined in claim 4 wherein said light assembly includes cooling means for cooling said lamp, said cooling means including fans mounted at both ends of said light assembly and first and second air flow paths associated with each of said fans for cooling respective end sections of said lamp.

6. The invention as defined in claim 5 wherein said air flow paths are each segregated by baffles into two sections.

7. A high intensity light including an arc lamp, a reflector, a housing, and a support assembly for said housing, comprising in combination:
   a light assembly to which said arc lamp is connected and on which said housing is mounted, said light assembly having first and second fan means for moving air over ends of said arc lamp, said first fan means moving air along a first air flow path toward a top ferrule having longitudinally extending first baffles segregating said top ferrule into two chambers and positioning a top end section of said arc lamp therebetween, said top end section associated with one of a cathode or anode of said lamp, said top ferrule having an inlet for receiving air, said air passing through one chamber of said top ferrule and along the length of said top end section of said lamp, past a heat sink integrally formed with said top end section, through passages formed in said top end section to a second chamber of of said top ferrule and back along said heat sink through an outlet in said top ferrule, said second fan means moving air along a second air flow path toward a bottom ferrule having longitudinally-extending second baffles segregating said bottom ferrule into two chambers and positioning a bottom end section of said arc lamp therebetween, said bottom end section associated with the other of a cathode or anode of said lamp, said bottom ferrule having a second inlet for receiving air, said air passing through one chamber of said bottom ferrul and along the bottom end section of said lamp, through second passages formed in said bottom end section to a second chamber of said bottom ferrule and along said bottom end section and through an outlet in said bottom ferrule, said air moving between said housing and said reflector to cool said reflector, whereby the efficiency of said lamp is increased.

8. The invention as defined in claim 7 wherein the first air flow path inlet and outlet are both outside a space defined between the reflector and a lens cover extending across said housing.

9. The invention as defined in claim 7 wherein the light assembly includes at a top end thereof radially-extending struts slideably and adjustably connected at a terminal end thereof to said housing and said bottom end of said light assembly is slideably and adjustably connected to said housing.

10. The invention as defined in claim 9 wherein the bottom end connection between said light assembly and said housing includes PTFE bushings whereby thermal expansion of the light is accommodated by the connection between the light assembly and the housing.

11. The invention as defined in claim 7 wherein the housing of said light is pivotally connected to a support assembly, said support assembly including a fixed base portion and a movable base portion, said fixed base providing pivotal movement about a first axis and said movable base providing pivotal movement about a second axis, whereby said light has universal movement, motor means provided for operatively moving said movable base about said first axis and said housing about said second axis.

12. A motion-controlled light for projecting a parabolic beam of light in a preselected pattern, comprising in combination:
- a housing having openings at each end, a top end having a lens covering mounted thereacross;
- a support assembly pivotally connected to said housing providing pivotal movement to said housing about two separate axes;
- motor means connected to said support assembly for pivoting said housing about each of said two axes;
- a light assembly slideably and adjustably connected to said housing along a central longitudinal axis thereof, said light assembly including a top end section and a bottom end section, said top end section including an integral heat sink; and
- cooling means for said top and bottom end sections of said light assembly, first cooling means adjacent to said top end section including a fan for moving air across said heat sink and through passages formed in said top end section, an exit of said first cooling means located exteriorly of said lens cover, second cooling means including a second fan for moving air through said passages in said bottom end section, each of said top and bottom end sections including baffles requiring air flow movement down one side and up the other side of said respective top and bottom end sections.

13. The invention defined in claim 12 wherein each of said top and bottom end sections are enclosed within top and bottom duct caps, each of said duct caps supporting said baffles interiorly thereof and extending longitudinally thereof to a position adjacent to said top and bottom end sections, each of said duct caps including an inlet adjacent to said first and second fans and an outlet, whereby air movement across said end sections is maximized and maximum heat dissipation possible.

14. The invention as defined in claim 12 wherein the top end of said light assembly includes radially extending struts slideably connected at a terminal end thereof to said housing and the bottom end of said light assembly includes radially-extending bolts passing through said housing, said struts and bolts aligned with slots in said housing whereby tightening or loosening the connection between said struts and bolts and said housing allows slideable movement of said light assembly relative to the parabolic reflector of said light.

* * * * *